United States Patent Office 3,627,485
Patented Dec. 14, 1971

3,627,485
METHOD OF PRODUCING CALCIUM SULFATE DIHYDRATE
Shoichiro Hori, Tokyo, and Keiichi Murakami and Hirobumi Tanaka, Miyagi-ken, Japan, assignors to Nippon Kokan Kabushiki Kaisha, Tokyo, Japan
No Drawing. Filed Nov. 5, 1968, Ser. No. 773,643
Int. Cl. C01b 25/22; C01f 11/46
U.S. Cl. 23—122                    6 Claims

ABSTRACT OF THE DISCLOSURE

Phosphoric acid-free and strontium-free calcium sulfate dihydrate is obtained from phosphate rock by decomposing phosphate rock with sulfuric and/or phosphoric acid of such temperature and concentration that a slurry of calcium sulfate dihydrate will be obtained. The temperature of the slurry is then raised to the conversion temperature of the calcium sulfate dihydrate into calcium sulfate semihydrate so that the calcium sulfate dihydrate will be converted into calcium sulfate semihydrate. Thereafter, the temperature is reduced to below the conversion temperature of the calcium sulfate semihydrate into calcium sulfate dihydrate whereby the calcium sulfate semihydrate will be converted into calcium sulfate dihydrate of high purity which may then be recovered in conventional manner, for istance by filtration. Preferably during the conversion of the semihydrate into the dihydrate, seed crystals consisting of twin crystals of calcium sulfate dihydrate are introduced.

BACKGROUND OF THE INVENTION

The present invention relates to a method of producing calcium sulfate dihydrate of high purity by decomposing phosphate rock and particularly strontium-containing phosphate rock with sulfuric acid or mixed acid comprising sulfuric acid and phosphoric acid or with phosphoric acid.

The decomposition reactions of phosphate rocks with respect to sulfuric acid, phosphoric acid and mixtures thereof differ depending on the origin of the phosphate rock. Particularly, the reactivity of strontium-containing volcanic apatite is rather low. The present invention is particularly concerned with obtaining calcium sulfate dihydrate of high quality and purity, practically free of phosphoric acid and strontium by an efficient decomposition of phosphate rocks of poor reactivity with sulfuric acid or with a mixed acid composed of sulfuric acid and phosphoric acid.

It is well known to produce phosphoric acid and calcium sulfate dihydrate by decomposing oceanic phosphate rock or Guano phosphate rock and the like either with sulfuric acid or mixed acid comprising sulfuric and phosphoric acid. In many cases, these decompositions are carried out at temperatures below 80° C. in order to directly obtain calcium sulfate dihydrate as a byproduct of the production of phosphoric acid. Such method will be referred to herein as the calcium sulfate dihydrate method.

According to this method, a byproduct consisting essentially of calcium sulfate dihydrate is obtained which, however, contains non-reacted phosphate rock and insoluble dicalcium phosphate. Since these phosphates cannot be removed by filtering and washing the byproduct, the yield of phosphoric acid is low and the gypsum obtained as the byproduct is of low purity and thus of relatively low commercial value.

It is an object of the present invention to overcome the difficulties encountered in decomposing phosphate rock, and especially phosphate rock containing strontium and of low reactivity, so as to obtain in a simple and economical manner calcium sulfate dihydrate of high purity.

SUMMARY OF THE INVENTION

According to the present invention, substantially phosphoric acid-free and strontium-free calcium sulfate dihydrate is obtained from strontimum-containing phosphate rock by decomposing phosphate rock with sulfuric acid or mixed sulfuric-phosphoric acid or, if desired, with phosphoric acid alone, which acid is of such temperature and which decomposition is carried out at such temperature that a slurry of calcium sulfate dihydrate will be obtained.

Thereafter, the temperature of the thus-obtained slurry is raised to at least the conversion temperature of the calcium sulfate dihydrate into calcium sulfate semihydrate so that the calcium sulfate dihydrate will be converted into calcium sulfate semihydrate. Then, the temperature is reduced to below the conversion temperature of the calcium sulfate semihydrate into calcium sulfate dihydrate so that the calcium sulfate semihydrate will be converted into calcium sulfate dihydrate which now accrues in highly pure and substantially phosphoric acid-free and strontium-free form. The thus obtained calcium sulfate dihydrate of high purity is then recovered, for instance by filtration, followed by washing of the filter cake consisting of calcium sulfate dihydrate.

According to a preferred embodiment, seed crystals consisting of twin crystals of calcium sulfate dihydrate are introduced during the conversion of the calcium sulfate semihydrate into calcium sulfate dihydrate.

DESCRIPTION OF THE PREFERRED EMBODIMENTS

According to the present invention, the wet process of producing phosphoric acid by decomposition of phosphate rock is modified and the method of the present invention, in view of the modifications which will be described below, may be indicated as a semihydrate-dihydrate calcium sulfate method.

It was proposed to decompose phosphate rock with sulfuric acid or mixed acid of sulfuric acid and phosphoric acid (or also with phosphoric acid alone, although this is generally less desirable than the decomposition with sulfuric acid or mixed sulfuric-phosphoric acid) and to keep the reaction temperature during the decomposition sufficiently high, namely preferably between 90 and 110° C., so that a slurry will be produced which contains as decomposition products of the phosphate rock calcium sulfate semihydrate and phosphoric acid.

Thereafter, with or without adding gypsum seed crystals to the slurry, the same is cooled to below the conversion temperature of the calcium sulfate semihydrate to calcium sulfate dihydrate, preferably to between 50 and 60° C., so that the calcium sulfate semihydrate of the slurry will be converted into calcium sulfate dihydrate. The thus obtained calcium sulfate dihydrate of high purity is then recovered, for instance by filtering and washing the thereby separated calcium sulfate dihydrate.

Since decomposition of the phosphate rock is carried out in accordance with the present invention at a relatively high tempertaure, it is possible to fully decompose the phosphate rock and, due to the fact that it is not possible under these reaction conditions to obtain dicalcium phosphate coexisting with calcium sulfate dihydrate, there will be no opportunity for growing mixed crystals of dicalcium phosphate and calcium sulfate dihydrate. Due to the similarity in the crystal structure of the two last-mentioned compounds, this danger exists if both compounds are permitted to be present simultaneously.

Consequently, calcium sulfate dihydrate of high quality and purity will be obtained as well as a high yield of concentrated phosphoric acid.

However, when working up volcanic phosphate rocks from the Kola Peninsula, Eastern Palambora, East Transvaal, the eastern Adirondacks and southern Ontario, materials are worked up which contain dicalcium phosphate as main constituent and in which strontium is substituted for a portion of the calcium. This portion of the rock is present in the form of a solid solution in which the ratio of strontium to calcium is about 1:6.8 at most and phosphate rocks of this type may contain up to 5% of strontium determined as strontium oxide.

This type of rock is inferior to oceanic phosphate rock and Guano phosphate rock with respect to its reactivity when being decomposed with sulfuric acid or a mixed acid of sulfuric acid and phosphoric acid, and for this reason, the semihydrate-dihydrate calcium sulfate method as described above will be advantageously used for decomposition of the last described types of phosphate rock, in preference over the simple dihydrate calcium sulfate method.

It has then been found that the industrial requirements cannot be fully met by thus producing calcium sulfate semihydrate since the latter has a relatively poor reactivity of hydration while in the phosphoric acid solution and thus the hydration of the semihydrate to dihydrate is unduly prolonged.

It has now been found that the cause of the poor reactivity of hydration of the calcium sulfate semihydrate may be the solid solution of strontium in the crystal lattice of the calcium sulfate semihydrate.

Strontium sulfate does not contain any water of crystallization and it is very stable and scarcely soluble in water and acid. Furthermore, strontium sulfate belongs to the same crystal lattice as insoluble calcium sulfate anhydrate and has a relatively similar crystal lattice as the soluble calcium sulfate anhydride. If water of crystallization, equal to ½ $H_2O$ is removed from the calcium sulfate semihydrate, its skeleton structure will closely resemble that of calcium sulfate anhydride lattice so that strontium can easily substitute for the calcium or calcium sulfate semihydrate and form a solid solution. By decomposing Kola apatite with sulfuric acid, the amount of solid solution of strontium in calcium sulfate semihydrate was found to approximate 1.5% X-ray diffraction of the calcium sulfate semihydrate showed the presence of the solid solution of strontium when compared with a calcium sulfate semihydrate sample obtained by decomposing reagent calcium phosphate or Florida phosphate rock. It may be concluded that the calcium sulfate semihydrate obtained by decomposing Kola phosphate rock with acids and containing strontium in solid solution is by its very nature more closely related to calcium sulfate anhydride than the calcium sulfate semihydrate obtained from other types of phosphate rocks, consequently, the calcium sulfate semihydrate obtained from Kola phosphate rock is much more difficult to hydrate into calcium sulfate dihydride when present in the phosphoric acid solution containing about 30% $P_2O_5$.

However, since calcium sulfate dihydrate is quite different in its crystal structure from that of calcium sulfate semihydrate or calcium sulfate anhydride and consequently also different from that of strontium sulfate, it was then concluded that calcium sulfate dihydrate free of a solid solution of strontium may be obtained as by-product in the decomposition of such phosphate rock by the calcium sulfate dihydrate method.

Investigations have shown that the strontium content of the calcium sulfate dihydrate will be less than 0.1%. Accordingly, in order to produce calcium sulfate dihydrate by acid decomposition of phosphate rocks of the type which contain strontium in solid solution, for instance Kola phosphate rock, the conventionally practiced calcium sulfate dihydrate method may be suitable, but it is not possible to obtain thereby calcium sulfate dihydrate of high purity and thus substantial economic usefulness.

A new method of producing single, coarse, large and useful gypsum crystals as well as phosphoric acid of high concentration in a high yield is therefore proposed, which method will permit decomposing of volcanic phosphate rocks having strontium partially substituted for calcium and present in solid solution.

According to this new method, the decomposition of the phosphate rock is carried out with sulfuric acid or mixed acid within ranges of temperature and acid concentration in which the calcium sulfate formed as by-product will be stable in the form of calcium sulfate dihydrate. Thereafter, the temperature is raised to the range in which the calcium sulfate will be stable in the form of calcium sulfate semihydrate within the thus-obtained slurry and then the temperature is again lowered to within the range in which calcium sulfate dihydrate remains stable.

It has been found that in the process of the present invention the temperature range in which calcium sulfate dihydrate will remain stable in the slurry formed by decomposition of the phosphate rock will have an upper limit below 70° C. and that the preferred temperature range will be between about 40 and 60° C., the optimum temperature becoming increasingly lower with increasing phosphoric acid concentration. The calcium sulfate semihydrate generally will be stable within the range of between about 85 and 110° C. and preferably, according to the present invention, a temperature of between 90 and 110° C. will be utilized. The required temperature or the optimum temperature will be progressively lower with progressively increasing concentration of the phosphoric acid.

It is particularly advantageous to add active seed crystals of the twin crystal type of calcium sulfate dihydrate in order to obtain quickly single, coarse, large crystals of calcium sulfate dihydrate during the lowering of the temperature from the semihydrate to the dihydrate range.

The preferred active seed crystals are calcium sulfate dihydrate crystals obtained by decomposing phosphate rock, limestone, slaked lime, calcium silicate or other calcium containing compounds with sulfuric acid at a temperature below 90° C. Preferably the seed crystals are introduced in an amount equal to between 0.1 and 1.0% of the weight of the calcium sulfate semihydrate contained in the slurry which is to be converted into calcium sulfate dihydrate.

It will be understood that the strontium is eliminated according to the present invention by utilizing initially the calcium sulfate dihydrate method, however, the initially produced calcium sulfate dihydrate contains dicalcium phosphate and the latter is eliminated by converting the calcium sulfate dihydrate into calcium sulfate semihydrate and subsequent reconversion into calcium sulfate dihydrate.

If, in contrast to the present invention, calcium sulfate dihydrate slurry is obtained, as described further above, by decomposing volcanic phosphate rock with sulfuric acid or mixed sulfuric-phosphoric acid, by the conventional calcium sulfate dihydrate method, the strontium will be present as insoluble and substantially non-reactive sulfate and can be separated as such without forming a salt solution in the crystals of calcium sulfate dihydrate. However, a portion of the dicalcium phosphate which is formed during the course of decomposing the phosphate rock, will form a solid solution within the crystals of calcium sulfate dihydrate.

However, when proceeding in accordance with the present invention, the dicalcium phosphate will be separated from the solid solution thereof, after, as pointed out above, strontium has been removed, by converting the slurry of calcium sulfate dihydrate into a slurry of calcium sulfate semihydrate. This is accomplished, as described above, by raising the temperature to or above the required conversion temperature. At the time of this conversion, strontium sulfate is no longer present in a form which could produce a solid solution thereof in the calcium sulfate semihydrate because in the preceding formation of the calcium sulfate dihydrate slurry, the strontium sulfate has been precipitated as a practically non-reactive, insoluble compound.

Consequently, if the now formed calcium sulfate semihydrate is reconverted into calcium sulfate dihydrate by suitable lowering of the temperature of the slurry of calcium sulfate semihydrate, a slurry of calcium sulfate dihydrate of high purity and quality will be obtained, as well as phosphoric acid of high concentration in a high yield, since neither strontium sulfate nor dicalcium phosphate will be present in the crystals of the calcium sulfate dihydrate formed by said reconversion.

The following examples are given as illustrative only, without, however, limiting the invention to the specific details of the examples.

Example 1

1000 g. of Kola phosphate rock are pulverized so that 90% thereof will pass through a 200 mesh screen.
The composition of the phosphate rock is as follows:

| | Percent |
|---|---|
| $H_2O$ | 0.10 |
| $P_2O_5$ | 38.66 |
| CaO | 48.82 |
| SrO | 2.50 |
| $SiO_2$ | 2.14 |
| F | 3.34 |
| $SO_3$ | 0.08 |
| $Al_2O_3$ | 0.54 |
| $Fe_2O_3$ | 0.27 |

The pulverized rock is introduced into 1061 g. of an aqueous phosphoric acid solution of 25% $P_2O_5$ content and kept with stirring at 40° C.

1797 g. of sulfuric acid having a concentration of 52.15% by weight are admixed with the amount of water required for obtaining after decomposition of the phosphate rock a solution of 30% $P_2O_5$ content. The mixture is then stirred at a temperature of about 60° C. and, in this manner a slurry is obtained containing 1469 g. of calcium sulfate dihydrate.

Thereafter, the temperature of the thus-obtained slurry is raised to about 100° C. and stirring is continued at such higher temperature for approximately 3 hours. Thereby, all of the calcium sulfate dihydrate of the slurry is converted into calcium sulfate semihydrate and a slurry is obtained containing 1239 g. of calcium sulfate semihydrate.

The temperature of the thus-obtained slurry is then again lowered to about 60° C. and the last-mentioned temperature is maintained for approximately 3 hours during which time the calcium sulfate semihydrate will be converted into calcium sulfate dihydrate.

Upon subsequent filtering and washing of the filter cake, a filtrate is obtained having a phosphoric acid concentration of more than 30% $P_2O_5$ and in an amount such that the yield of $P_2O_5$ based on the original phosphate rock exceeds 97%.

At the same time, the solids of the slurry are separated in the form of 1469 g. pure of calcium sulfate dihydrate.

The thus-obtained calcium sulfate dihydrate consisted of single large crystals having an approximate width of 50–100 microns and an approximate length of 50–300 microns.

After once rewashing the thus-obtained calcium sulfate dihydrate it is found that the residual soluble $P_2O_5$ content thereof was 0.03% and the residual insoluble $P_2O_5$ content was 0.05%. Strontium could hardly be determined in the thus-obtained pure gypsum.

Example 2

1000 g. of pulverized phosphate rock of the same particle size and composition as described in Example 1 is introduced into 1061 g. of a phosphoric acid solution having a $P_2O_5$ content of 25%, and the mixture is maintained while stirring at a temperature of 40° C. 1800 g. sulfuric acid of a concentration equal to 52.15% by weight are then introduced as described in Example 1 and the mixture is then maintained with stirring at a temperature of about 60° C. so as to obtain a slurry of calcium sulfate dihydrate.

The temperature of the slurry is then raised to approximately 100° C. and the slurry is stirred at such higher temperature for approximately 3 hours so that all of the calcium sulfate dihydrate of the slurry will be changed into calcium sulfate semihydrate.

Thereafter, 20 g. of active seed crystals consisting of calcium sulfate dihydrate and having a size of about 10 microns is added to the slurry of calcium sulfate semihydrate and the temperature lowered to approximately 60° C.

In about 2 hours, the calcium sulfate semihydrate slurry is thereby hydrated into a slurry of calcium sulfate dihydrate.

After filtering and washing of the thus-obtained calcium sulfate dihydrate slurry, 1480 g. of calcium sulfate dihydrate is obtained and simultaneously a filtrate consisting of aqueous phosphoric acid having a $P_2O_5$ content of more than 30%.

The crystals of the thus-obtained calcium sulfate dihydrate have a width of between about 70 and 150 microns and a length of between about 100 and 400 microns, i.e. these crystals are coarser and larger than those obtained according to Example 1.

Upon once rewashing the previously filtered and washed calcium sulfate dihydrate crystals, it is found that the residual content of soluble $P_2O_5$ equals 0.02% and the residual content of insoluble $P_2O_5$ equals 0.04%, and again strontium could hardly be found in the thus-obtained gypsum of high purity.

The active seed crystals which are utilized according to the present example are obtained by adding a phosphoric acid solution of 6.9% $P_2O_5$ content at a temperature of 90° C. to Florida phosphate rock ($P_2O_5$ 31.0%, total CaO 46.0%) which phosphate rock had been pulverized so that 90% thereof will pass through a 200 mesh screen, this mixture is stirred, sulfuric acid of 98% by weight concentration is added and the mixture kept under stirring at 60° C. for about 1 hour, followed by filtering and washing the thus-obtained crystals.

Without further analysis, the foregoing will so fully reveal the gist of the present invention that others can by applying current knowledge readily adapt it for various applications withot omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method of producing calcium sulfate dihydrate substantially free of phosphoric acid and strontium from phosphate rock containing insoluble and relatively inert strontium sulfate, comprising the steps of decomposing phosphate rock with at least one aqueous acid selected from the group consisting of sulfuric acid and phosphoric acid so as to obtain a slurry of calcium sulfate dihydrate containing dicalcium phosphate with up to about 1.5% of strontium sulfate; increasing the temperature of said slurry to at least the conversion temperature of said calcium sulfate, dihydrate into calcium semihydrate, thereby effecting said conversion while converting said dicalcium phosphate into calcium sulfate and leaving said strontium sulfate behind; reducing the temperature below that at which calcium sulfate semihydrate is converted into calcium sulfate dihydrate so as to convert said calcium sulfate semihydrate into calcium sulfate dihydrate; and recovering the thus-obtained calcium sulfate dihydrate whereby calcium sulfate dihydrate of high purity, substantially free of strontium and phosphoric acid is obtained.

2. A method as defined in claim 1, wherein said recovering of calcium sulfate dihydrate is carried out by filtering, and washing of the calcium sulfate dihydrate filter residue.

3. A method as defined in claim 1, wherein said aqueous acid is a mixed acid consisting of sulfuric and phosphoric acid.

4. A method as defined in claim 1 wherein during conversion of said calcium sulfate semi-hydrate into calcium sulfate dihydrate, seed crystals of calcium sulfate dihydrate are introduced in an amount of from 0.1 to 1% of the calcium sulfate semi-hydrate present in said slurry.

5. A method as defined in claim 4 wherein said seed crystals are twin crystals formed by decomposing calcium-containing material with sulfuric acid or with mixed sulfuric-phosphoric acid at a temperature of 40–70° C. at which calcium sulfate dihydrate is stable.

6. A method as defined in claim 5 wherein said twin crystals of calcium sulfate dihydrate are produced, comprising the steps of adding phosphoric acid with a $P_2O_5$ content of about 6.9% to a finely pulverized phosphate rock with a $P_2O_5$ content of about 31% and a total CaO content of about 46%; bringing the mixture to 90° C.; adding 98 weight percent sulfuric acid with stirring; continuing to stir at about 60° C. for about 1 hour; and recovering, by filtering and washing, the crystals thus obtained.

References Cited

UNITED STATES PATENTS

| 1,902,648 | 3/1933 | Larsson | 23—165 |
| 1,916,431 | 7/1933 | Larsson | 23—165 |

FOREIGN PATENTS

| 718,837 | 9/1965 | Canada | 23—165 |

OTHER REFERENCES

Van Wazers: Phosphorus and Its Compounds, vol. II, 1961, 970–973.

OSCAR R. VERTIZ, Primary Examiner

G. A. HELLER, Assistant Examiner

U.S. Cl. X.R.

23—165